United States Patent [19]
Tanio

[11] Patent Number: 5,930,389
[45] Date of Patent: *Jul. 27, 1999

[54] IMAGE PROCESSING APPARATUS WITH COLOR-SPACE CONVERSION

[75] Inventor: Satoshi Tanio, Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/992,689

[22] Filed: Dec. 17, 1997

Related U.S. Application Data

[62] Division of application No. 08/528,536, Sep. 14, 1995, Pat. No. 5,726,778.

[30] Foreign Application Priority Data

Sep. 16, 1994 [JP] Japan ................................. 6-221755
Sep. 16, 1994 [JP] Japan ................................. 6-221756

[51] Int. Cl.⁶ ................................................. G06K 9/00
[52] U.S. Cl. ................................. 382/167; 358/523
[58] Field of Search ................................. 382/162, 167; 358/518, 523, 540; 395/114

[56] References Cited

U.S. PATENT DOCUMENTS

| | | | |
|---|---|---|---|
| 4,743,962 | 5/1988 | McCormick | 358/524 |
| 5,208,911 | 5/1993 | Newman et al. | 358/518 |
| 5,251,020 | 10/1993 | Sugiyama | 358/500 |
| 5,267,333 | 11/1993 | Aono et al. | 382/166 |
| 5,465,165 | 11/1995 | Tanio et al. | 358/448 |
| 5,475,496 | 12/1995 | Kumada | 358/523 |
| 5,481,380 | 1/1996 | Bestmann | 358/523 |
| 5,489,996 | 2/1996 | Oku et al. | 358/518 |
| 5,504,592 | 4/1996 | Usami et al. | 358/518 |
| 5,513,320 | 4/1996 | Tsai | 395/114 |
| 5,552,905 | 9/1996 | Tanaka | 358/524 |
| 5,699,489 | 12/1997 | Yokomizo | 395/109 |

*Primary Examiner*—Phuoc Tran
*Attorney, Agent, or Firm*—Fitzpatrick, Cella, Haroer & Scubti

[57] ABSTRACT

An image processing apparatus is constructed by: an input device to input a command; a first communicating unit to communicate with a first external device; a second communicating unit to communicate with a second external device; a managing unit to manage the communicating units in correspondence to the external devices; a storage unit to store a plurality of image data in correspondence to image types of the image data; a color space converting unit to automatically color space convert on the basis of the image type corresponding to the image data stored in the storage unit and the external device which is set on the basis of the command; an output unit to output the image data whose color space was converted by the color space converting unit to the external device set on the basis of the command; and an automatic recognizing unit to automatically recognize the external devices by communicating with each of the first and second external devices by using the first and second communicating units.

7 Claims, 12 Drawing Sheets

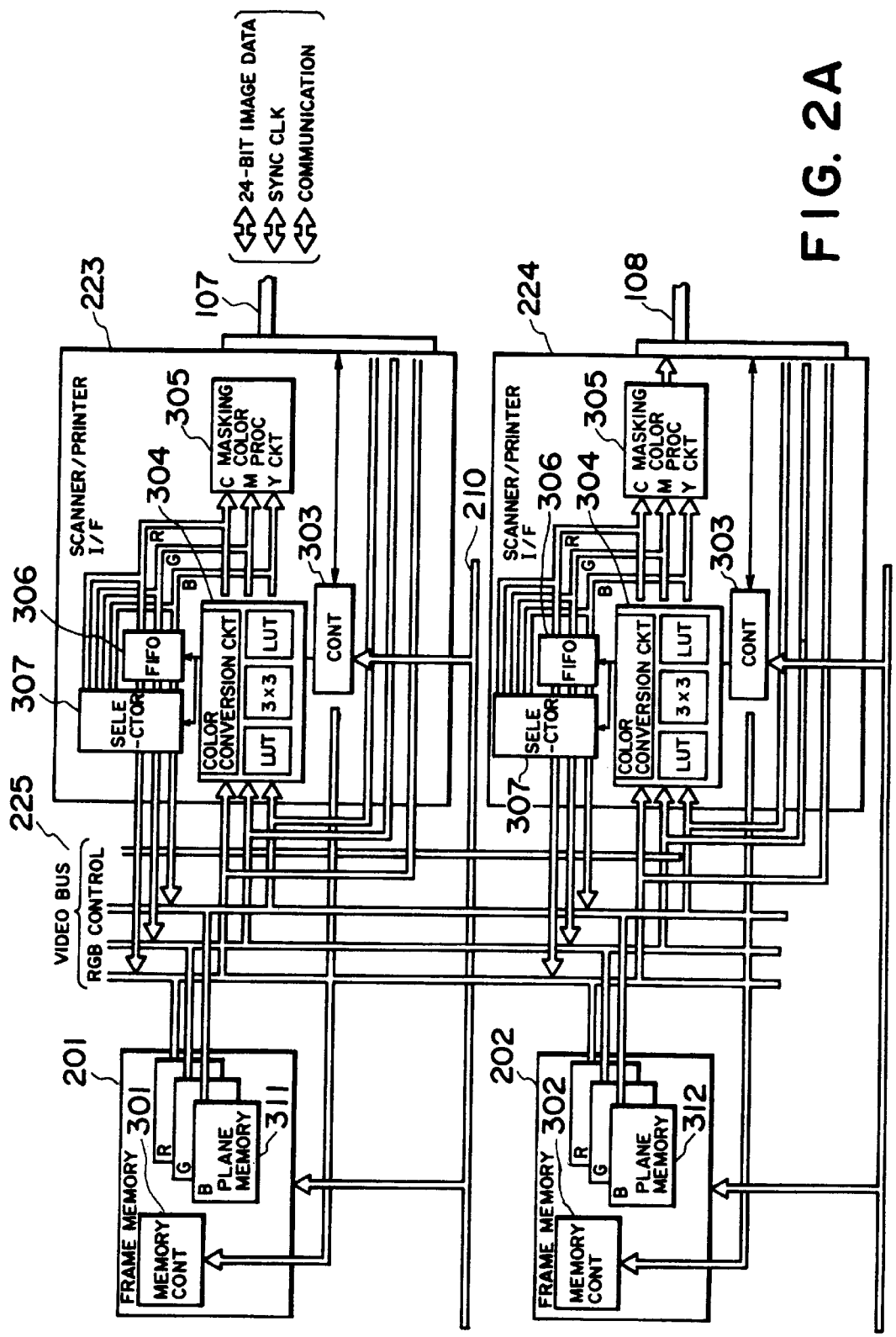

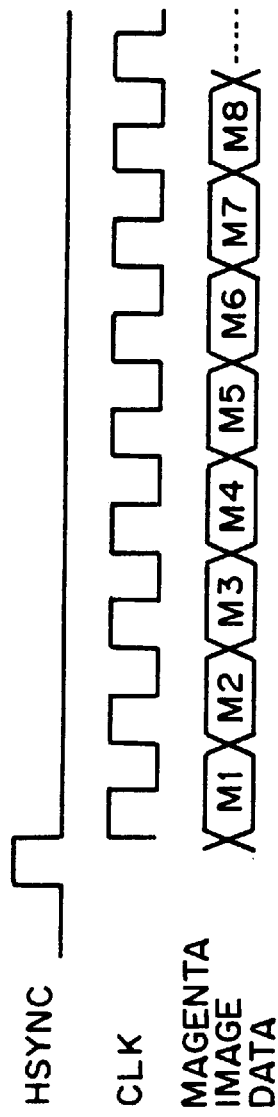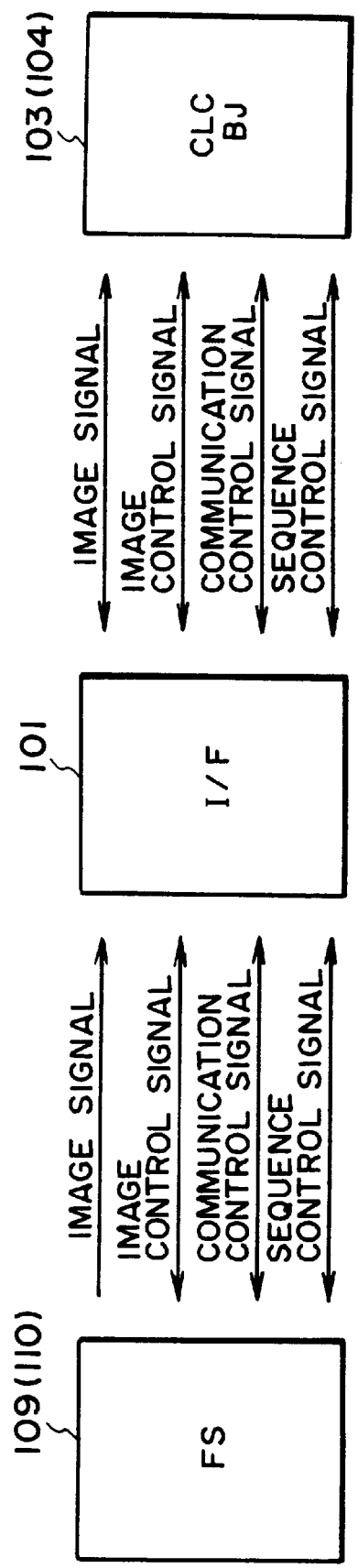

CONFIGURATION TABLE

FIG. 8A

| BYTE\BIT | 7 | 6 | 5 | 4 | 3 | 2 | 1 | 0 |
|---|---|---|---|---|---|---|---|---|
| 0 | SLOT 0 ENGINE CARD 0 CODE ||||||||
| 1 | SLOT 1 ENGINE CARD 1 CODE ||||||||
| 2 | SLOT 0 DEVICE CODE ||||||||
| 3 | SLOT 1 DEVICE CODE ||||||||

ENGINE CARD

FIG. 8B

| ENGINE CARD NAME | ENGINE CARD CODE |
|---|---|
| CLC | 00H |
| BJ | 40H |
| ENGINE CARD UNMOUNTED | FFH |

DEVICE CODE

FIG. 8C

| DEVICE NAME | DEVICE CODE |
|---|---|
| CLC1 | 00H |
| CLC2 | 01H |
| BJ | 04H |
| DEVICE UNCONNECTED/ POWER SOURCE OFF | FFH |

FIG. 8D

| BYTE\BIT | 7 | 6 | 5 | 4 | 3 | 2 | 1 | 0 |
|---|---|---|---|---|---|---|---|---|
| 0 | SLOT 0 FILM DEVICE CODE ||||||||
| 1 | SLOT 1 FILM DEVICE CODE ||||||||

FILM SCANNER DEVICE CODE

FIG. 8E

| FILM DEVICE NAME | FILM DEVICE CODE |
|---|---|
| FS1 | 00H |
| DEVICE UNCONNECTED/ POWER SOURCE OFF | FFH |

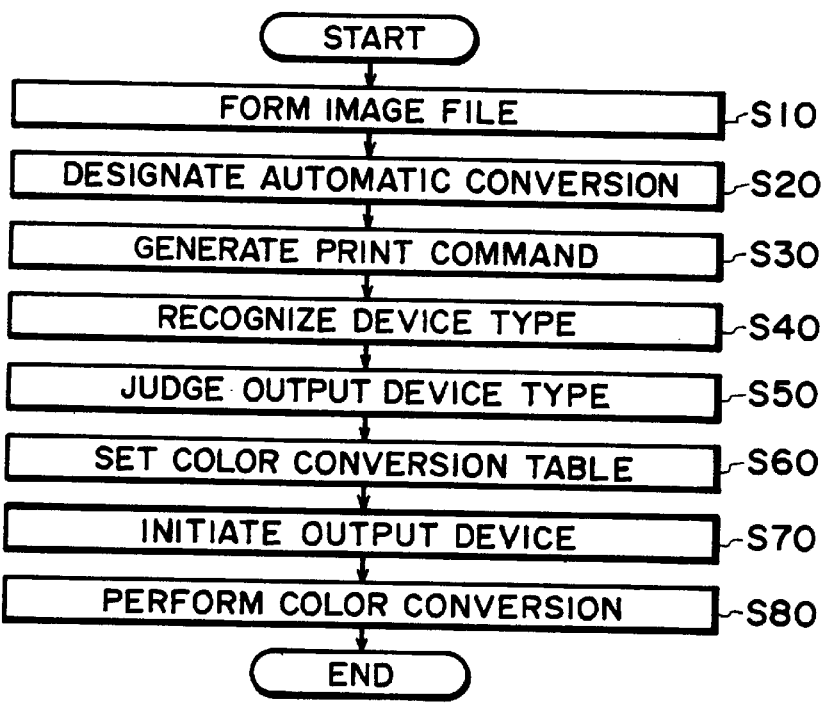

FILE INFORMATION

| | 7 | 6 | 5 | 4 | 3 | 2 | 1 | 0 |
|---|---|---|---|---|---|---|---|---|
| 0 | COMMAND CODE (C6H) ||||||||
| 1<br>2 | LIST FILE PARAMETERS LENGTH ||||||||
| 3 | LIST FILE DESCRIPTER BLOCK LENGTH ||||||||
| 4 | RESERVED ||||||||
| 5<br>6<br>7<br>8 | IMAGE MEMORY<br>REMAINING CAPACITY (BYTE) ||||||||
| 9 | FILE ID ||||||||
| 10 | IMAGE TYPE ||||||||
| 11<br>12 | WIDTH (2 BYTE) ||||||||
| 13<br>14 | HEIGHT (2 BYTE) ||||||||
| 15 | FILE STATUS ||||||||
| 16 | VOLUME No.<br>(4 BITS) |||| INPUT DEVICE<br>TYPE (4 BITS) ||||
| 17 | RESERVED ||||||||
| 18 | IMAGE TYPE OPTIONAL CODE ||||||||
| 19 | FILE TYPE ||||||||
| 20 | COMPRESSION IMAGE TYPE ||||||||
| 21<br>22<br>23<br>24 | (MSB) COMPRESSED<br>IMAGE SIZE (4 BYTE)<br>(LSB) ||||||||
| 25<br>⋮<br>* | HEREINAFTER,<br>REPEAT FIELDS 6 TO 20 ||||||||

F I G. 12

NATIVE COLOR SPACE
AUTO CONVERSION PAGE

| | 7 | 6 | 5 | 4 | 3 | 2 | 1 | 0 |
|---|---|---|---|---|---|---|---|---|
| 0 | RESERVED | PAGE CODE (2DH) |||||||
| 1 | PAGE LENGTH (02H) ||||||||
| 2 | AUTOMATIC CONVERSION DESIGNATION ||||||||
| 3 | RESERVED ||||||||

F I G. 13

COLOR CONVERSION TABLE IN CASE OF INPUT BY CLC 103

| INPUT DEVICE | REGISTRTION FILE TYPE | LUT-a | 3×3 | LUT-b |
|---|---|---|---|---|
| CLC 103-RGB | CLC 103-RGB | EXPONENT OF a1 | 103 103 MATRIX | INVERSE EXPONENT OF a1 |
| CLC 103-RGB | CLC 104-RGB | EXPONENT OF a1 | 103 104 MATRIX | INVERSE EXPONENT OF a2 |
| CLC 103-RGB | MONITOR-A RGB | EXPONENT OF a1 | 103 MTR-A MATRIX | INVERSE EXPONENT OF a3 |
| CLC 103-RGB | MONITOR-B RGB | EXPONENT OF a1 | 103 MTR-B MATRIX | INVERSE EXPONENT OF a4 |
| | | | | |

COLOR CONVERSION TABLE IN CASE OF INPUT BY CLC 104

| INPUT DEVICE | REGISTRTION FILE TYPE | LUT-a | 3×3 | LUT-b |
|---|---|---|---|---|
| CLC 104-RGB | CLC 104-RGB | EXPONENT OF a2 | 104 104 MATRIX | INVERSE EXPONENT OF a2 |
| CLC 104-RGB | CLC 103-RGB | EXPONENT OF a2 | 104 103 MATRIX | INVERSE EXPONENT OF a1 |
| CLC 104-RGB | MONITOR-A RGB | EXPONENT OF a2 | 104 MTR-A MATRIX | INVERSE EXPONENT OF a3 |
| CLC 104-RGB | MONITOR-B RGB | EXPONENT OF a2 | 104 MTR-B MATRIX | INVERSE EXPONENT OF a4 |
| | | | | |

COLOR CONVERSION TABLE IN CASE OF OUTPUT BY CLC 103

| REGISTRTION FILE TYPE | OUTPUT DEVICE | LUT-a | 3×3 | LUT-b |
|---|---|---|---|---|
| CLC 104-RGB | CLC 103-RGB | EXPONENT OF a2 | 104 103 MATRIX | INVERSE EXPONENT OF a1 |
| CLC 103-RGB | CLC 103-RGB | EXPONENT OF a1 | 103 103 MATRIX | INVERSE EXPONENT OF a1 |
| MONITOR-A RGB | CLC 103-RGB | EXPONENT OF a3 | MTR-A 103 MATRIX | INVERSE EXPONENT OF a1 |
| MONITOR-B RGB | CLC 103-RGB | EXPONENT OF a4 | MTR-B 103 MATRIX | INVERSE EXPONENT OF a1 |
| | | | | |

COLOR CONVERSION TABLE IN CASE OF OUTPUT BY CLC 104

| REGISTRTION FILE TYPE | OUTPUT DEVICE | LUT-a | 3×3 | LUT-b |
|---|---|---|---|---|
| CLC 104-RGB | CLC 104-RGB | EXPONENT OF a2 | 104 104 MATRIX | INVERSE EXPONENT OF a2 |
| CLC 103-RGB | CLC 104-RGB | EXPONENT OF a1 | 103 104 MATRIX | INVERSE EXPONENT OF a2 |
| MONITOR-A RGB | CLC 104-RGB | EXPONENT OF a3 | MTR-A 104 MATRIX | INVERSE EXPONENT OF a2 |
| MONITOR-B RGB | CLC 104-RGB | EXPONENT OF a4 | MTR-B 104 MATRIX | INVERSE EXPONENT OF a2 |
| | | | | |

FIG. 14

LIST OF IMAGE TYPE

| IMAGE TYPE | IMAGE TYPE OPTION CODE | IMAGE TYPE |
|---|---|---|
| 0 | 0 | BIT MAP |
| 1 | 1 | RESERVED |
| 2 | 0 | CLC104/103 RGB |
|  | 1 | CLC103 DEVICE RGB |
|  | 2 | CLC104 DEVICE RGB |
|  | 3 | RESERVED |
|  | 4 | MONITOR-A |
|  | 5 | MONITOR-B |

FIG. 15

COLOR SPACE CONVERSION COMMAND

| | 7 | 6 | 5 | 4 | 3 | 2 | 1 | 0 |
|---|---|---|---|---|---|---|---|---|
| 0 | IMAGE PROC CODE (25H) ||||||||
| 1 | PARAMETER LENGTH (11H) ||||||||
| 2 | FILE IDENTIFIER ||||||||
| 3 | RESERVED ||||||||
| 4 | RESERVED ||||||||
| 5 | RESERVED ||||||||
| 6 | RESERVED ||||||||
| 7 | RESERVED ||||||||
| 8 | RESERVED ||||||||
| 9 | RESERVED ||||||||
| 10 | RESERVED ||||||||
| 11 | RESERVED ||||||| CLR |
| 12 | COLOR SPACE CONVERSION IMAGE FILE IDENTIFIER ||||||||
| 13 | IMAGE TYPE ||||||||
| 14 | IMAGE TYPE OPTIONAL CODE ||||||||
| 15 16 | RESERVED ||||||||
| 17 18 | RESERVED ||||||||

FIG. 16

IMAGE PROCESSING APPARATUS WITH COLOR-SPACE CONVERSION

This a divisional of application Ser. No. 08/528,536 filed on Sep. 14, 1995, now U.S. Pat. No. 5,726,778.

BACKGROUND OF THE INVENTION

1. Field of the Invention

The invention relates to an image processing apparatus for color-space converting inputted color image data on the basis of an output apparatus for outputting.

2. Related Background Art

In recent years, various digital color copying apparatuses have become widespread and there has been developed a system such that various kinds of interface devices are connected to such a digital color copying apparatus and a print output can be obtained on the basis of image data from another image input apparatus such as a scanner or the like other than the digital color copying apparatus.

Each of the apparatuses such as a digital color copying apparatus and the like constructing such a system has a color space that is peculiar to the type of apparatus. It is necessary to input/output image data among the different types of apparatuses. For example, when an image read by an image input apparatus is printed out by a color copying apparatus, since there is the color space that is peculiar to each type of the apparatuses, it is necessary to convert the color space of the input device to the color space of the copying apparatus on the output side before printing. When an image corresponding to a color space of a monitor such as NTSC, Apple display of 13 inches, or the like is printed out as an image source by the copying apparatus, it is also necessary to convert the color space of the monitor to the color space of the copying apparatus before outputting.

In the above conventional example, however, since the color space which the image data stored in the system has is not managed, there is a problem in that a color space converting process must be manually designated.

There is also a case where image data inputted from various kinds of input devices is edited and outputted.

Hitherto, however, the image data which has once been subjected to the color space converting process cannot be made to correspond to the image type, i.e., the color space after completion of the color space converting process, and cannot be stored again.

Therefore, there is a problem in that a converting process cannot be executed on the basis of a plurality of image data which were once subjected to the color space converting process.

SUMMARY OF THE INVENTION

The invention is made in consideration of the above mentioned problems and it is an object of the invention to automatically perform an optimum color space converting process without manually designating the color space converting process.

The invention is made in consideration of the above mentioned problems and it is an object of the invention to store image data subjected to the color space converting process, in correspondence to an image type.

Another object of the invention is that by executing the color space converting process suitable for each image data and by forming an synthetic image on the basis of a plurality of image data obtained, a synthetic image which accurately conforms to each original can be obtained without being influenced by an input device.

According to the invention, to accomplish the above objects, there is provided an image processing apparatus comprising: input means for inputting a command; first communicating means for communicating with a first external apparatus; second communicating means for communicating with a second external apparatus; managing means for managing the communicating means and the external apparatuses so as to correspond to each other; storing means for storing image data and an image type of the image data so as to correspond to each other; color space converting means for automatically converting a color space on the basis of the image type corresponding to the image data stored in the storing means and the external apparatus which is set on the basis of the command; and output means for outputting the image data whose color space was converted by the color space converting means to the external apparatus set on the basis of the command.

To accomplish the above object, there is also provided an image processing apparatus comprising: input means for inputting a command to set an image type of image data after completion of a color space conversion; storing means for storing the image data by making the image data and the image type correspond to each other; and color space converting means for converting a color space of the image data read out from the storing means on the basis of the image type corresponding to the image data stored in the storing means and the image type which is set on the basis of the command, wherein the image data whose color space was converted by the color space converting means is stored to the storing means.

To accomplish the above object, there is also provided an image processing apparatus comprising: input means for inputting a command; first communicating means for communicating with a first external apparatus; second communicating means for communicating with a second external apparatus; managing means for managing the communicating means and the external apparatuses so as to correspond to each other; storing means for storing a plurality of image data into different files by making the image data and the image type correspond to each other; color space converting means for converting a color space of the image data on the basis of the image type corresponding to the image data stored in the storing means and the image type which is set on the basis of the command; and synthesizing means for synthesizing the plurality of image data stored in the plurality of files of the storing means, wherein when synthesizing by the synthesizing means, a color space of each of the plurality of images is converted to the image type which is set on the basis of the command by the color space converting means and is stored into the different file, respectively.

The above and other objects and features of the present invention will become apparent from the following detailed description and the appended claims with reference to the accompanying drawings.

BRIEF DESCRIPTION OF THE DRAWINGS

FIG. 2A is a diagram showing in detail a part of an internal construction of an apparatus 101 in FIG. 1;

FIG. 4 is a timing chart showing a signal format when color image data is outputted to the color copying apparatus shown in FIG. 3;

FIG. 5 is a diagram showing an example of a signal construction among an interface (I/F) device, the color copying apparatus, and a film scanner in the embodiment;

FIGS. 8A to 8E are diagrams showing storage formats and contents of device information of the color copying apparatus and film scanner;

FIG. 9 is a diagram showing the storage format of information regarding a sheet cassette;

FIG. 10 is a flowchart showing an example of a color converting process of the embodiment;

FIG. 11 is a diagram for explaining a format of a CREATE FILE command for file formation and parameters;

FIG. 12 is a diagram showing file information which has been registered;

FIG. 13 is a diagram showing a command format of an automatic conversion designation command of a color conversion (Native Color Space Auto Conversion PAGE);

FIG. 14 is a diagram showing relations among device types and file types and color conversion tables of the color copying apparatus;

FIG. 15 is a diagram showing codes of the file types;

FIG. 16 is a diagram showing an example of color space conversion commands; and

DESCRIPTION OF THE PREFERRED EMBODIMENTS

The preferred embodiments of the invention will now be described hereinbelow in detail with reference to the drawings.

Figure 1:
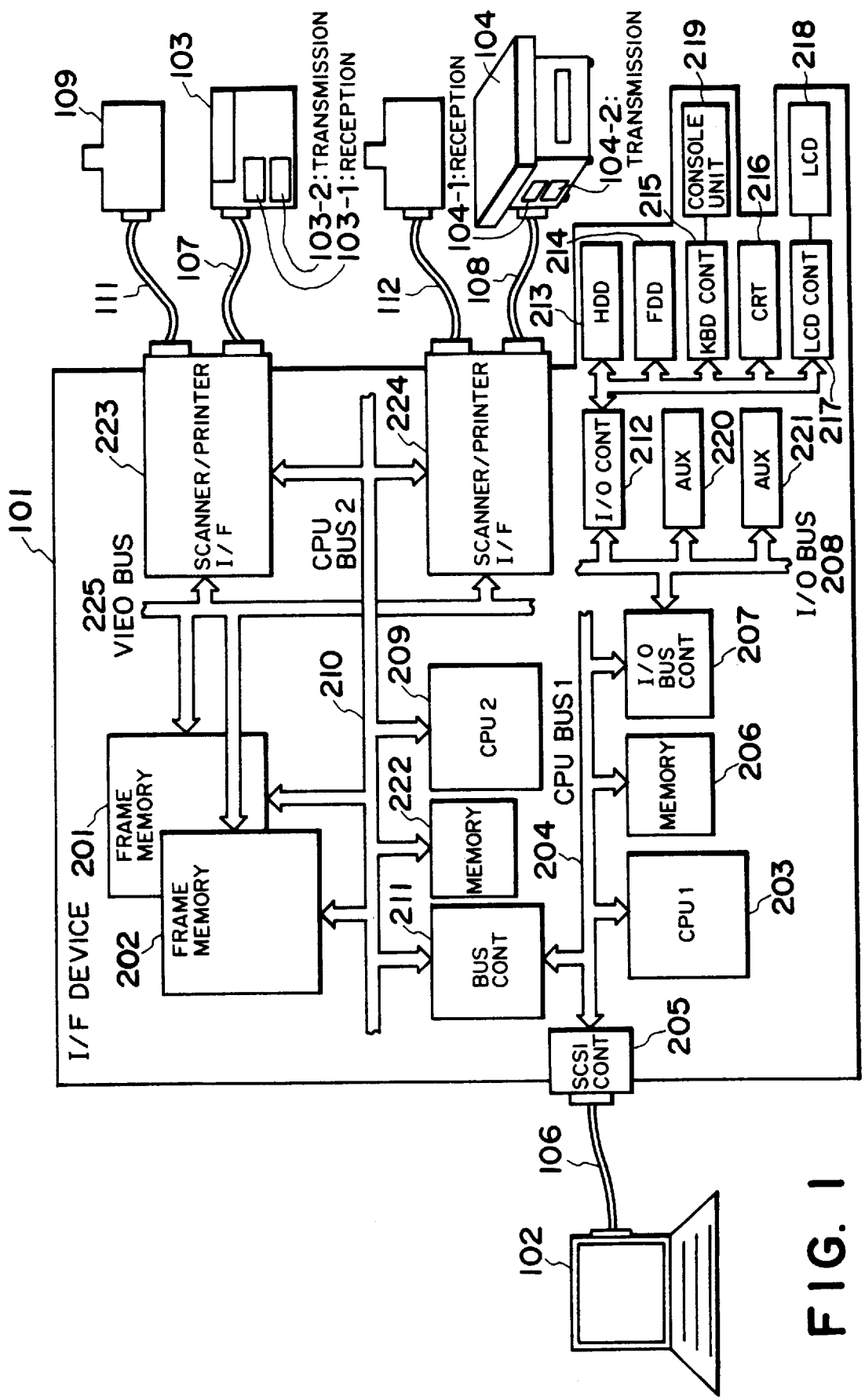
FIG. 1 is a block diagram showing a construction of a color image processing system of an embodiment of the invention.

FIG. 1 shows a connection schematic constructional diagram in an example of a system construction in the present invention. Reference numeral 101 denotes an interface (I/F) device serving as a main unit of the invention. Its internal schematic constructional diagram is shown. Reference numeral 102 denotes a host computer which is connected to the I/F device 101 via an interface cable 106. As such an I/F device, for example, a general interface such as an SCSI or the like is used. The I/F device 101 can transmit computer graphics image data from the host computer 102 to frame memories 201 and 202 of the I/F device 101, so that a print output can be obtained by using color copying apparatuses 103 and 104. The host computer can also control the whole system by transmitting a control command. The digital color copying apparatuses 103 and 104 are connected to the I/F device 101 by interface cables 107 and 108. As mentioned above, such interface cables are used to obtain the print outputs of the images stored in the frame memories 201 and 202 in the I/F device 101. The images read from scanners of the color copying apparatuses 103 and 104 can be also stored into the frame memories 201 and 202 in the I/F device 101. Each of the color copying apparatuses 103 and 104 can control the whole system from its console unit in a manner similar to the host computer 102. Reference numerals 109 and 110 denote film scanners which are connected to the I/F device 101 by interface cables 111 and 112. In a manner similar to the color copying apparatuses 103 and 104, the images read from the film scanners can be stored into the frame memories 201 and 202 in the I/F device 101. In place of the film scanners 109 and 110, apparatuses for fetching video images of an HDTV or the like or other various kinds of image fetching apparatuses can be connected and can similarly store the images into the frame memories in the I/F device 101 and can generate print outputs. The system construction has been described above mainly with respect to the I/F device 101.

An internal construction of the I/F device 101 will now be described hereinbelow. Reference numeral 203 denotes a first CPU (CPU1) for controlling I/O devices other than the scanners and printers which are connected to the outside. Details of the CPU will be described hereinlater. Reference numeral 204 denotes a CPU bus of the CPU 203. An SCSI controller 205 for interfacing with the host computer 102, a program memory 206, a bus controller 207 for controlling an I/O bus 208, and the like are connected to the CPU bus 204. A bus controller 211 is also connected to the CPU bus 204 so that it can be connected to a CPU bus 210 of a second CPU (CPU2) 209. The second CPU 209 will be explained hereinlater. An I/O controller 212 is connected to the I/O bus 208, thereby controlling general I/O devices such as hard disk drive 213, floppy disk drive 214, keyboard controller 215, CRT controller 216, LCD controller 217, and the like. Reference numeral 218 denotes a liquid crystal display (LCD) apparatus which can always display a state of the I/F device 101. A console unit 219 is connected to the keyboard controller 215 and can change an initial setting of the I/F device 101 and can independently set a service mode. As necessary, a monitor can be connected from the outside via the CRT controller 216 and, further, a keyboard can be also connected through the keyboard controller 215. Further, AUX slots 220 and 221 are prepared for the I/O bus 208. An interface card such as a CD-ROM or the like can be loaded into those slots. Various kinds of images stored in the CD-ROM can be developed to the frame memories 201 and 202 and print outputs can be also obtained. In future, it is also possible to cope with multimedia or the like.

The second CPU 209 can control the scanner and printer which are connected to the outside and can further also perform image processes such as image rotation, image compression, and the like to the images which are stored in the frame memories 201 and 202. A memory 222 is a program memory constructed in a manner such that when a power source is turned on, a control program is loaded from the hard disk drive 213 into the memory 222 through the bus controller 211. The memory 222 is also used for communication with the CPU 203. Two kinds of scanner/printer interfaces 223 and 224 are connected to the CPU bus 210 and control the scanners and printers while performing various kinds of setting operations. Reference numeral 225 denotes a bus that is used only for images (video bus). When images are scanned or printed, the images flow in the bus 225.

The I/F device 101 can connect two kinds of scanner/printer interfaces. Even scanners/printers of different types such as electrostatic photographing type, ink jet type, and the like can be connected.

Since the devices of the different types can share the same frame memory, it is unnecessary to preset the frame memories in correspondence to the devices of the different types, so that the memories can be efficiently used.

Such interfaces can newly replace interface boards in accordance with the type or speed of a copying apparatus which is connected, so that they can also cope with a future application.

Therefore, such interfaces can flexibly cope with the apparatus that is connected, so that the system has an expandability.

In the embodiment, as mentioned above, as devices other than the scanners/printers, the two kinds of film scanners 109 and 110 can be connected to the scanner/printer interfaces 223 and 224 in addition to the color copying apparatuses 103 and 104. The devices which can be connected to the apparatus of the invention are not limited to the above mentioned film scanner and scanner/printer but also other device such as ink jet printer, scanner, or the like can be also connected.

FIG. 2A shows a diagram showing an example of a construction of the scanner/printer interfaces 223 and 224 and frame memories 201 and 202.

The frame memories 201 and 202 have the same construction comprising plane memories 311 and 312 of red (R), green (G), and blue (B) and controllers 301 and 302 for controlling the plane memories 311 and 312.

The memory controllers 301 and 302 control processes such as reading, writing, refreshing, and the like of the image data in the plane memories 311 and 312.

The foregoing two memories can operate independently. Namely, during the print output of one memory, another memory can transfer the image from the host computer 102 through the CPU bus 210, develop a postscript image, or perform the foregoing image processes using the CPU 209. The memories can be also regarded as one memory by connecting them. For example, in the case where each memory has a memory capacity corresponding to images of an original of the A4 size, by connecting the two memories, images of an original of the A3 size can be handled.

The scanner/printer interfaces 223 and 224 have also the same construction in which the same circuits are designated by the same reference numerals. A color conversion circuit 304 converts a color space of inputted image data to image data of a desired color space. A masking color processing circuit 305 executes image editing processes such as masking, UCR operating process, and the like according to color reproducing characteristics of an output apparatus connected in order to accurately reproduce the images. When the image data is read and written from/to the same frame memory, an FIFO 306 adjusts a timing for writing the image data to the frame memory. A selector 307 switches a path of the image data in accordance with whether it is necessary to adjust the write timing or not. A controller 303 controls the foregoing circuits.

In this instance, there is assumed a system such that the color copying apparatus 103 of the electrostatic photographing type (hereinbelow, referred to as a CLC type) is connected to the scanner/printer interface 223 through the cable 107 and the color copying apparatus 104 of the CLC type is connected to the scanner/printer interface 224 through the cable 108.

The operation in the case where the image stored in the plane memory 311 in the I/F device 101 is outputted by using the color copying apparatus 103 on the basis of a print command generated from the host computer 102 will now be described.

The CPU 203 receives the print command from the host computer 102 through the SCSI controller 205. The CPU 209 interprets such a command and writes the contents of the received command into the memory 222 under the control of the bus controller 211. When recognizing the writing of the command, the CPU 209 reads out the contents in the memory 222 and executes the print command. The CPU 209 outputs a command to generate the print command to the color copying apparatus 103 to the controller 303 in the interface 223. The controller 303 generates the print command to the color copying apparatus 103 through the cable 107 by communication. The inside of each of the cables 107, 108, 111, and 112 has the same connection state, and 24-bit image data, a sync signal, a clock, and a communication are enclosed in one cable in the two-way directions. The color copying apparatus 103 which received the print command activates the printer and, at the same time, returns an image sync signal. The controller 303 which received the image sync signal multiplexes an image request signal to a control bus in the video bus 225 in response to the image sync signal and generates an image output request to the memory controller 301. The memory controller 301 outputs the image data of 24-bit RGB from the plane memory 311 to the video bus 225 in accordance with the image request signal. The outputted image data is supplied to the color conversion circuit 304 in the interface 223. The color conversion circuit 304 converts the image data of a predetermined RGB color space to the image data of a color space of magenta (M), cyan (C), and yellow (Y) of the color copying apparatus 103, thereby outputting the converted image data to the masking color processing circuit 305. The masking color processing circuit 305 executes image editing processes such as masking, UCR operating process, and the like according to the color reproducing characteristics of the color copying apparatus 103 in order to accurately reconstruct the image and transfers data of C, M, Y, and K (black) to the color copying apparatus via the cable 107.

The color space is expressed on the basis of a signal format such as RGB signals, CMY signals, or the like and a predetermined reference value that is peculiar to each apparatus.

In the cable 107, the image data is area-sequentially transferred in accordance with the order of M, C, Y, and K synchronously with the development of the image in the color copying apparatus by using eight bits among 24 bits of the image data. Consequently, the same image data of RGB is read out from the frame memory 201 total four times, thereby performing the same processing.

The invention is not limited to such a method whereby the image data is area-sequentially transferred but the image data can be also transferred by, for example, a dot-sequential method or the like. The image data is transferred by a method supported by an output apparatus.

Figure 3:
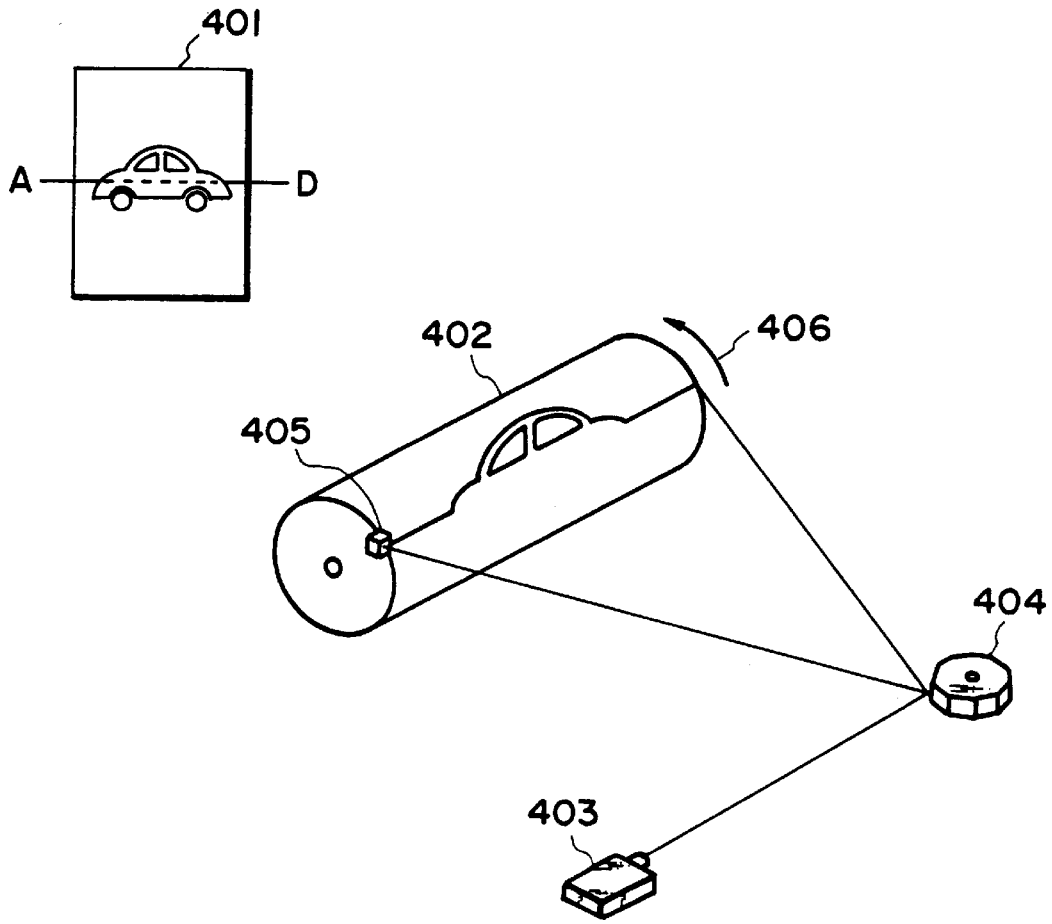
FIG. 3 is a diagram showing a first example of a color copying apparatus.

FIG. 3 shows a state in which the color copying apparatus 103 forms an image from the image data received from the interface 223. Reference numeral 401 denotes image data stored in the frame memory and, for example, shows a state in which an electrostatic latent image of magenta in an interval between A–D in the diagram is formed on a photosensitive drum 402; 403 a laser light source which is turned on or off on the basis of the image data that is transferred and forms an electrostatic latent image on the photosensitive drum 402 via a polygon mirror 404; and 406 a rotating direction of the photosensitive drum 402. In this instance, an edge of the image is detected by a beam detecting sensor 405 and its detected output becomes a horizontal sync signal (hereinbelow, referred to as an HSYNC), thereby synchronizing the image transfer. FIG. 4 shows a state of such a timing. The above operations are repeated total four times with respect to C, M, Y, and K, thereby forming the image. The above-mentioned example relates to the case where an LOG conversion circuit and a masking circuit are provided on the interface device 101 side. The LOG conversion circuit and masking circuit on the color copying apparatus side can be also commonly used. In this case, 24 bits of an image data line in the cable 107 are fully used and transferred as RGB image data.

Subsequently, on the contrary to the above operation, the operation such that the image data indicative of an original obtained by using the color scanner of the color copying apparatus 103 is stored into the frame memory 201 will now be described.

The CPU 203 receives a scan command from the host computer 102 through the SCSI controller 205 and recognizes and executes it. The CPU 209 generates the scan command to the color copying apparatus 103 via the controller 303 by a communication. The color copying apparatus 103 transfers the image data of the RGB color space based on input characteristics of the color copying apparatus 103 obtained by scanning the original on the basis of the scan command as RGB image data by fully using 24 bits of the image data signal in the cable 107. In the interface device 101, the transferred RGB image data is inputted to the color conversion circuit 304 in the interface 223 and the color space of the image data is converted in accordance with a connection device and a file type that is registered and is outputted to the video device 225. Simultaneously, the controller 303 outputs a fetching request signal to the control bus for the memory controller 301. The memory controller 301 stores the image on the video bus 225 into the plane memory on the basis of the fetching request signal. Although the explanation has been made above with respect to the frame memory 201, as for the frame memory 202, similarly, for example, when the controller 303 multiplexes the request signal onto the control bus and supplies to the memory controller 302, the frame memory 202 also similarly starts the operation. In this instance, the scanner/printer interfaces 223 and 224 don't simultaneously operate in order to avoid a conflict of the buses of the controller 303 and the color conversion circuit 304.

Although the operations for the input/output of the image regarding the color copying apparatus 103 have been shown and described above, the color copying apparatus 104, film scanner, and the like also operate in a similar manner.

Further as an example of another operation, a case where the image data in the frame memory 201 is color converted by using the above circuits used at the time of the scanning and printing (hereinbelow, such a color converting process is referred to as "round rotation") will now be explained. First, although an image sync signal is necessary in a manner similar to the case of printing, it is generated by an internal circuit (not shown). The controller 303 which received the image sync signal multiplexes the image request signal to the control bus in the video bus 225 in response to the image sync signal and generates an image output request to the memory controller 301 and also generates an image input request to the FIFO 306, respectively. The FIFO 306 has a capacity of 256 kbytes for each of R, G, and B, independently.

The reason why the FIFO 306 is used is because different from the above scanning and printing operations, since the image data is read and written from/to the same frame memory, it is necessary to adjust the write timing to the frame memory.

The memory controller 301 outputs the 24-bit image data of RGB to the video bus 225 in accordance with the image request signal. The outputted image data is inputted to the color conversion circuit 304 in the interface 223 and converted to an arbitrary color space. The image data that was once converted is stored in the FIFO 306. A procedure for rewriting the image data stored in the FIFO 306 to the frame memory 201 will now be described. In a manner similar to the case of scanning, the controller 303 outputs the fetching request signal for the memory controller 301 and the image output request for the FIFO 306 to the control bus, respectively. The memory controller 301 stores the image on the video bus 225 to the plane memory on the basis of the fetching request signal. The FIFO 306 has a capacity of only 256 kbytes. Since the image data ordinarily amounts to or even exceeds several Mbytes, such operations are repetitively divisionally executed several times, thereby converting all of the data.

The selector 307 selects either one of the mode in which the image data passed through the color conversion circuit is written into the frame memories 201 and 202 via the FIFO 306 and the mode in which such image data is directly written to those memories without intervening the FIFO 306. When the image data is fetched from a device connected to the outside and is stored into the frame memory, the FIFO 306 is set so as to be skipped. In the above round rotating process, in the case where the image data after completion of the color conversion is stored into another frame memory, the FIFO 306 is set so as to be skipped.

Although the input/output operations of the image regarding the color copying apparatus 103 have been described above, the color copying apparatus 104, film scanner, and the like also execute similar operations.

FIG. 5 shows a signal construction between the I/F device and device such as color copying apparatus, film scanner, or the like. The image signal is transmitted by the 24-bit signal line as mentioned above. The image signal is a control signal to transfer the image data and is constructed by a pixel sync signal, a line sync signal, and a page sync signal. A communication control signal is a signal to execute the operation instruction and the state management by a serial communication of command/status. A sequence control signal is a signal to transmit information indicative of a power state of each device.

Figure 6:
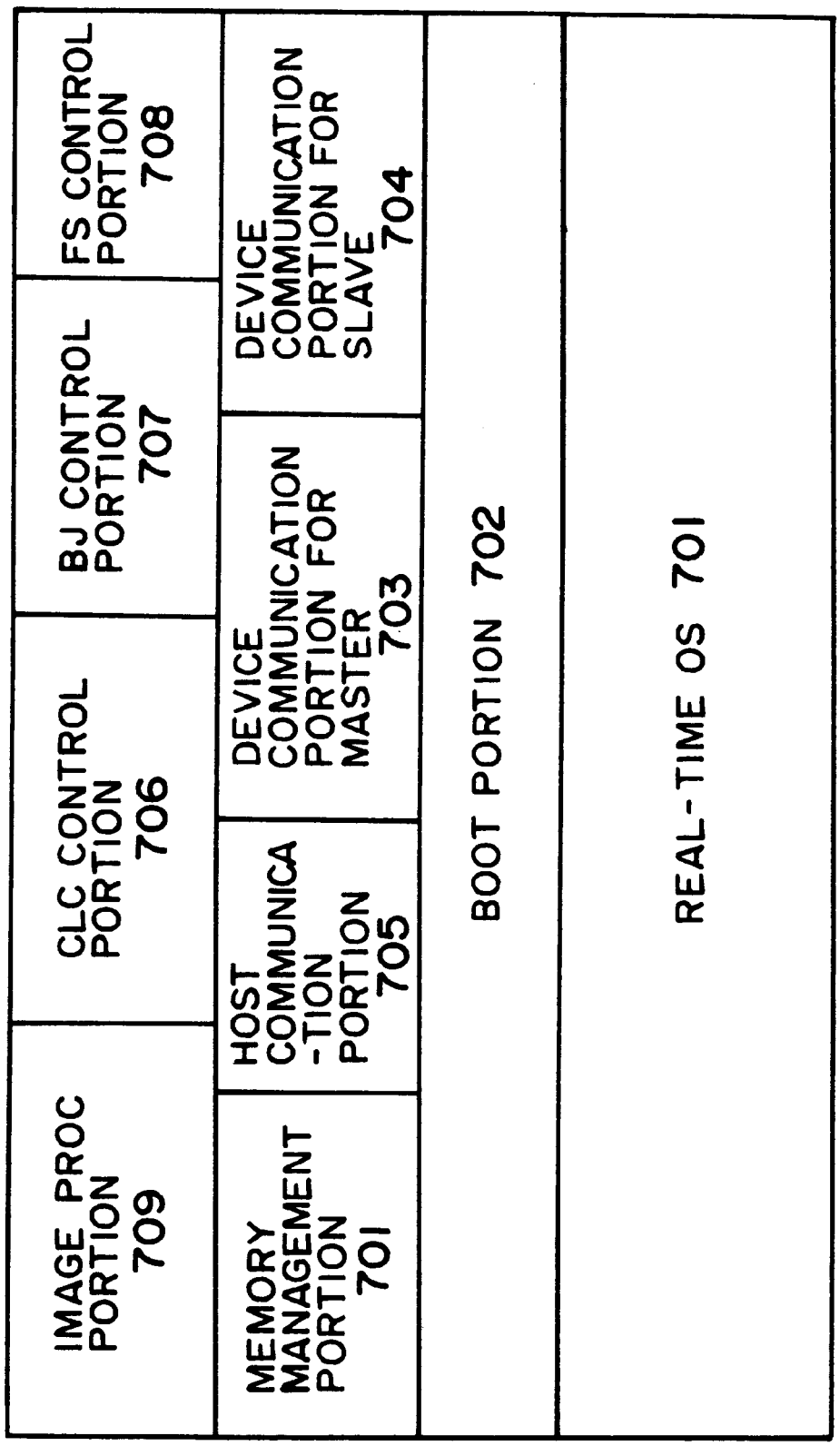
FIG. 6 is a diagram showing an example of a module construction of a control program of a CPU 209 of the embodiment.

FIG. 6 shows a module construction of the control program which operates on the CPU2 side that is downloaded to the program memory after the power source is turned on in the embodiment. A module 701 denotes a real-time OS which manages a plurality of tasks. Each task is activated when an event is driven. A module 702 denotes a task which runs at the time of the activation of the control program and performs an initial setting of various ICs and frame memories, an initial setting of parameter variables that are used in the control program, an identification of interface boards, and the like. Modules 703 and 704 execute a command communication with the color copying apparatus or film scanner. The module 703 denotes a communication control task. According to this task, in the case where the I/F device is set to the master side and the color copying apparatus side is set to a slave side, a command is generated from the I/F device and the color copying apparatus side returns a status. The module 704 denotes a communication control task of the type opposite to that of the module 703. According to this task, a command is generated from the color copying apparatus side and the I/F device returns a status. A module 705 performs a command communication with the CPU1 and an image transfer control. Thus, the command received from the host computer through the SCSI controller is analyzed on the CPU2 side, thereby transmitting an instruction to start a process to the communication control task or image processing task. Modules 706, 707, and 708 denote image input/output control tasks for managing input/output controls of the image data for the color copying apparatus of the CLC or BJ type or film scanner, respectively. A module 709 manages the image processes such as compression, extension, and rotation of the image, mirror image, color-space compression, color-space conversion, and the like. A module 710 manages the image files which are registered in the frame memories 201 and 202.

Figure 7:
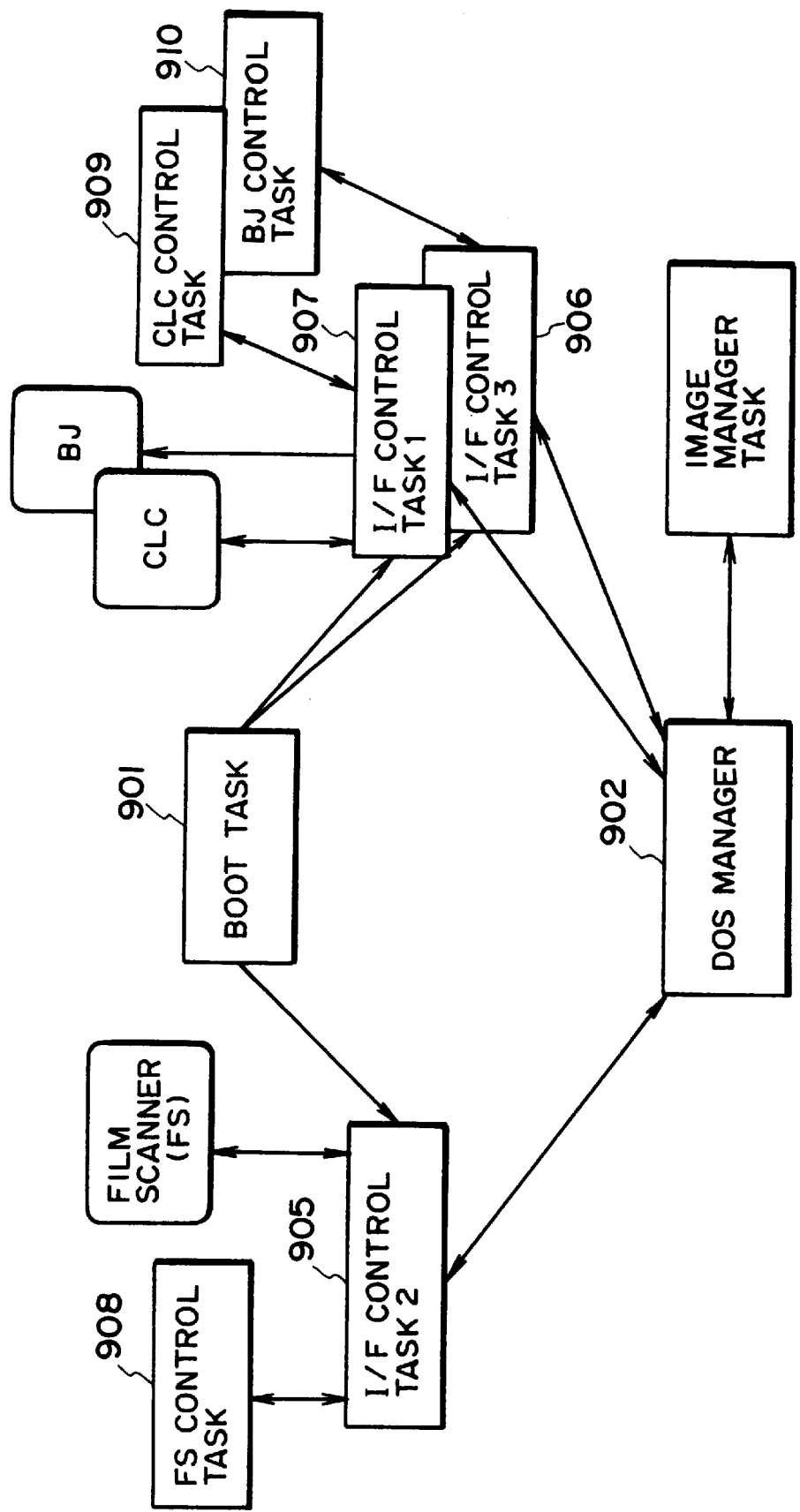
FIG. 7 is a software constructional diagram of the embodiment.

FIG. 7 shows a software system constructional diagram of the I/F device. The operation of the system will now be described with reference to the diagram. After the power source was turned on, first, the real-time OS of the module 701 is activated, thereby forming tasks 901 and 902. The task 901 manages the boot portion 702 and sets card codes in a configuration table of FIG. 8A at the time of the initial setting.

The configuration table manages whether the boards set in the slots, namely, the scanner/printer interfaces 223 and 224 and the output device and film scanner connected to the slots have been connected or not.

Although not shown, each of the scanner/printer interfaces 223 and 224 has a construction such that an interface board is inserted and has a board for identifying the type of each board. By setting an ID to such a board every board type in a hardware manner, the board can be read out by the CPU2, so that the set board can be automatically recognized in correspondence to the slot. The board ID indicates a communication type. On the basis of the recognition, each of engine card codes shown in FIG. 8B is written to a position of the corresponding slot in the configuration table.

Further, a power-ready state of the color copying apparatus or film scanner which is transmitted by the sequence control signal of the interface is discriminated by checking a port (not shown) for signal detection on the interfaces 223 and 224. When each device has been activated, communication control tasks 905, 906, and 907 are formed in accordance with the engine code in the configuration table. Each of the tasks 905 and 907 performs the communication control of the communication type in the case where the I/F device of the module 703 is set to the master side. The task 906 performs the communication control of the communication type in the case where the I/F device of the module 704 is set to the slave side. Such tasks transmit/receive commands/statuses to/from the color copying apparatus and film scanner side. On the basis of the information obtained by such a communication, a device code, cassette information, and the like are set into device information tables of FIGS. 8A to 8E and 9.

Therefore, first, by discriminating the inserted interface board and managing the card codes in correspondence to the slots, the communication type is set. On the basis of the set communication type, the interface device communicates with the connected device, the device codes shown in FIGS. 8C and 8E are made correspond to the slots and are set into the Configuration Tables shown in FIGS. 8A and 8D. By means of the above processes, the interface device 101 can automatically recognize the connected devices in correspondence to the slots.

Since the foregoing connected device recognizing process is executed every day when the power source is turned on, the newest system state can be always grasped.

The task 902 manages the module 705 and analyzes the command received from the host computer. When receiving the print/scan command, the task 902 activates image input/output control tasks 908, 909, and 910 through the communication control tasks 905, 906, and 907. In this instance, the slot in which an I/F card has been loaded is selected by a parameter in association with the print/scan command. The image input/output control which differs every device is executed in accordance with the device code in the Configuration Table in FIG. 8A.

Thus, by which device the scan is performed or the printing is executed can be switched in accordance with a user's application. Further, image input/output tasks of different control types such as CLC type, FS type, and the like can be operated according to the connected device.

The setting of the color conversion table upon scanning/printing will now be described.

Figure 2B:
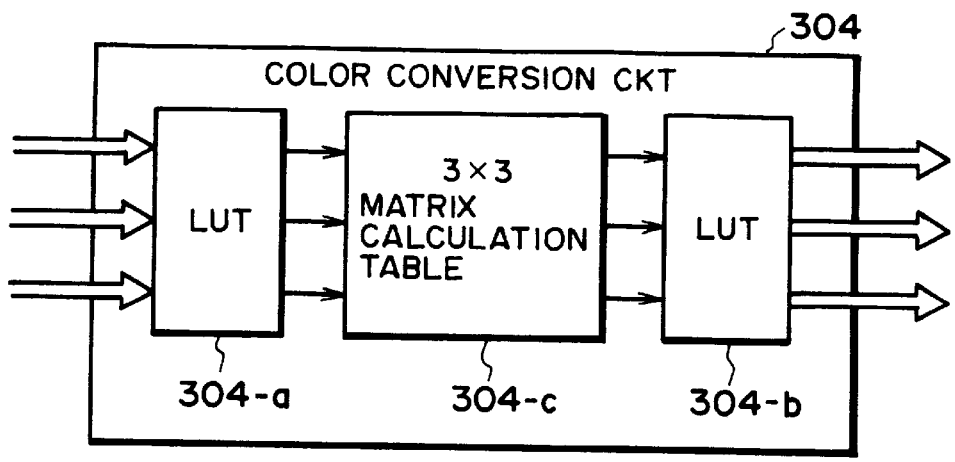
FIG. 2B is a diagram showing an example of a construction of a color conversion circuit.

First, as shown in FIG. 2B, the color conversion circuit 304 comprises: two lookup tables (LUT) 304-a and 304-b in which data from 0 to 255 can be set; and one table 304-c for matrix calculation of (3×3). The LUT 304-a is a table for exponent calculation for correcting characteristics depending on an input device of image data that is inputted to the color conversion circuit 304. The matrix calculation table 304-c is a table for matrix calculation of (3×3) for converting the data corrected by the LUT 304-a to the image data on the color space of the output device. The LUT 304-b is a table for exponent calculation for correcting the image data that was color-space converted by the matrix calculation table 304-c to characteristics of the output device. FIG. 14 shows combination examples of those tables.

In the embodiment, as for the correction of the input/output characteristics in the LUTs 304-a and 304-b, since a plurality of LUTs are prepared on the basis of the color spaces, namely, the image types of the input/output devices and each LUT is set in accordance with the color space converting process, it is sufficient to keep a small number of LUTs.

Further, since the data whose input characteristics were corrected is color-space converted by using the matrix calculation table of (3×3), the accurate converting process which doesn't depend on the input characteristics can be executed.

As mentioned above, by executing the color space conversion by the combination of the three tables, as shown in FIG. 14, the apparatus can cope with various color space converting processes by a simple construction and a desired color space converting process can be also accurately executed.

Further, since the color space converting process can be executed by a hardware circuit, the process can be executed in a real-time manner.

A setting procedure will now be described hereinbelow with reference to FIG. 10. In step S10, an image type, namely, a color space when the image data is stored into the frame memory 202 is designated by a CREATE FILE command in FIG. 11 on the basis of a combination of the IMAGE TYPE and IMAGE TYPE Optional Code, thereby forming the image file. FIG. 15 shows a list of the correspondence of the combination of the IMAGE TYPE and the IMAGE TYPE Optional Code and the image type.

In this instance, a table of FIG. 12 is formed as file information. Such information is used to manage the image data stored in the frame memory 202 and includes various kinds of information such as image type, file ID, and the like designated by the CREATE FILE command when the file is formed.

In step S20, a check is made to see if the automatic conversion is performed or not. According to the automatic conversion, when the image data in the interface device is outputted to the output device, it is automatically converted to the color space that is supported by the output device which is designated by the print command.

Whether the automatic conversion is executed by a Native Color Space Auto Conversion PAGE command shown in FIG. 13 or not is designated. When it is not designated, the color space conversion is not automatically executed.

In step S30, the print command is generated. When the output device to print is the output device connected to the slot 0, namely, in the case where the CLC 103 is not used in the above example of the system, a slot switching command is also simultaneously generated.

In step S40, the image input/output control tasks 908 and 909 are activated on the basis of the print command generated in step S30. First, the type of the device that is connected is recognized on the basis of the device code in the Configuration Table in FIG. 8.

In step S50, the type of the output device is judged on the basis of whether the slot switching command has been generated or not in step S30. the interface device is set so that the slot 0 operates as a default. However, when the slot switching command is generated, the slot is switched and the slot 1 is made operative, thereby preparing to output the image data to the CLC 104.

In step S60, predetermined tables are set as shown in FIG. 14 into the color conversion circuit 304 for the LUTs 304-*a* and 304-*b* in the color conversion circuit 304 adapted to the file information shown in FIG. 12 and the table 304-*c* for matrix calculation of (3×3) corresponding to the output device to output the image data judged in step S50 and the file in which the image data to be outputted has been stored.

In step S70, the connected device is activated through the communication control tasks 905 and 906 and when the image data is inputted or outputted to/from the color copying apparatus as a device connected, the image data passes through the color conversion circuit 304 and is color-space converted in a real-time manner.

According to the embodiment as mentioned above, the optimum color space converting process can be automatically executed.

The above processes shown in FIG. 10 are the processes which are effective when the image synthesis is not performed, namely, in case of a single layout. However, in the case where a plurality of images inputted from different devices and stored by various IMAGE TYPEs are synthesized and outputted by a desired output device, such processes cannot be used.

Figure 17B:
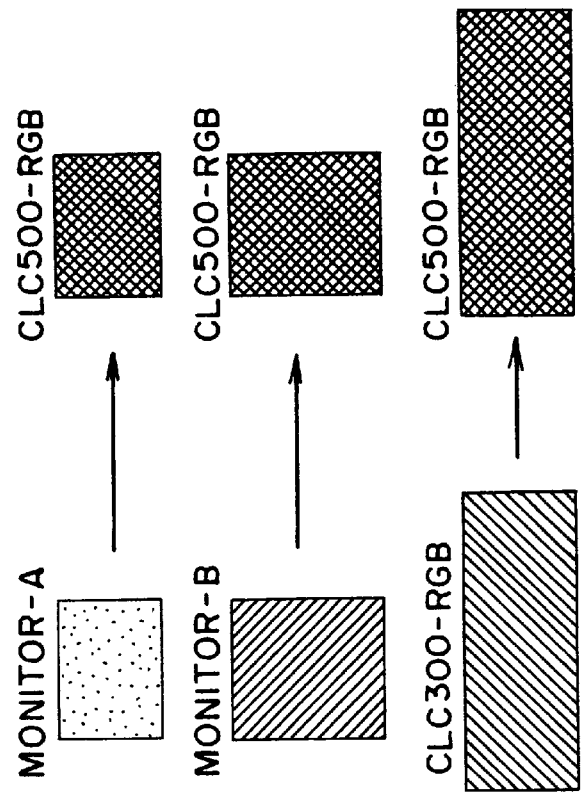
FIGS. 17A to 17C are diagrams showing procedures when image files of a plurality of different image types are laid out and printed.
Figure 17A:
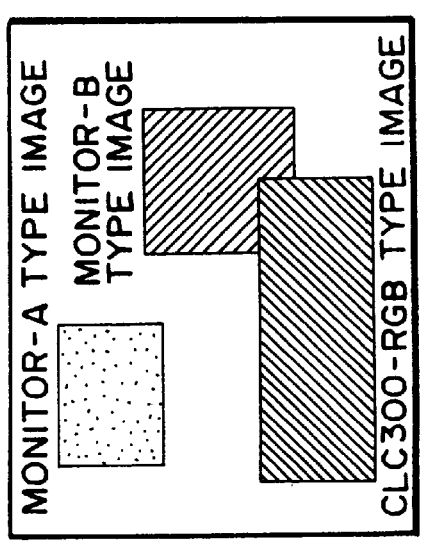
Figure 17C:
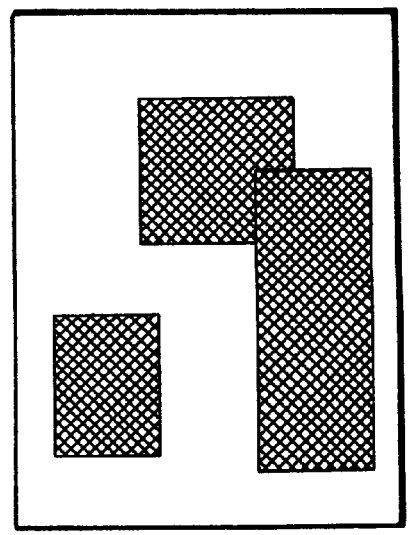

A case of printing out the result of layout of images of a plurality of different image types will now be described hereinbelow with reference to FIGS. 17A to 17C. Since the color conversion circuit 304 can set only one kind of conversion table, when there are a plurality of images of different image types, it is necessary to unify the types of all of the image data prior to printing. In case of layout-printing three images of different image types (FIG. 17A), each image first has to be converted to the color space of the connected device. By using the color space conversion command shown in FIG. 16, the file ID of the registration image as a target of the conversion, the IMAGE TYPE to be converted, the IMAGE TYPE Optional Code, and the file ID on the writing destination side are designated, thereby allowing the conversion to be executed. In this instance, data is set into the LUTs 304-*a* and 304-*b* of the color conversion circuit 304 and the table of the matrix of (3×3) on the basis of the image type obtained from the file information in FIG. 12 and the image type of the registration image, thereby executing the round rotation (FIG. 17B). By repeating the above operations three times, three image types are respectively converted and the image data is stored into the file by the same image type. By using the files stored, the image synthesizing process is executed on the basis of the print command generated (FIG. 17C). The resultant data is outputted to a desired output device.

The image synthesizing process can be simply executed by controlling the reading operation from the file in which each image has been stored.

As an output device which is used in the invention, a device having heads of the type in which a liquid droplet is emitted by causing film boiling by means of thermal energy, and a recording method using such heads can be also used.

The present invention can be applied to a system constructed by a plurality of apparatuses or to an apparatus constructed by one piece of equipment.

Therefore, since the image data subjected to the color space converting process is stored in correspondence to the image type, the image type of the image data can be always recognized and the optimum color process can be executed.

Since the color space converting process suitable for each image data is executed and a synthetic image is formed on the basis of a plurality of image data obtained, a synthetic image which accurately conforms to each original can be obtained without being influenced by the input device.

The present invention is not limited to the foregoing embodiments but many modifications and variations are possible within the spirit and scope of the appended claims of the invention.

What is claimed is:

1. A color image processing apparatus which synthesizes a plurality of color images and outputs the obtained image to a desired output device, comprising:
   discrimination means for communicating with the plurality of output devices to discriminate a type of each output device;
   storage means for storing conversion data corresponding to a color space of each output device;
   input means for inputting the plurality of color images respectively represented by different color spaces;
   selection means for selecting the conversion data according to the color space of each color image and the type of the output device for outputting the image, from among the conversion data stored in said storage means;
   color space conversion means for converting each color image into the color space of the output device for outputting the image, by using the selected conversion data; and
   synthesis means for synthesizing the color-space converted images and storing the obtained image into one file.

2. An apparatus according to claim 1, wherein the conversion data consists of a plurality of conversion parameters.

3. An apparatus according to claim 1, wherein the plurality of output devices are connected to others through different communication lines.

4. An apparatus according to claim 1, further comprising communication means for communicating with a host computer, and
   wherein layout information of each color image is inputted from the host computer.

5. A color image processing method in which a plurality of color images are synthesized and the obtained image is outputted to a desired output device, said method comprising:

a discrimination step of communicating with the plurality of output devices to discriminate a type of each output device;

a storage step of storing conversion data corresponding to a color space of each output device;

an input step of inputting the plurality of color images respectively represented by different color spaces;

a selection step of selecting the conversion data according to the color space of each color image and the type of the output device for outputting the image, from among the conversion data stored in said storage step;

a color space conversion step of converting each color image into the color space of the output device for outputting the image, by using the selected conversion data; and a synthesis step of synthesizing the color-space converted images and storing the obtained image into one file.

6. An image processing method executed under control of an operating system (OS), comprising the steps of:

inputting a discrimination result discriminated by communicating with a plurality of output devices to discriminate a type of each output device;

inputting a plurality of color images respectively represented by different color spaces;

reading out conversion data according to the color space of each color image and the type of the output device for outputting the image, from among conversion data stored in a storage means;

converting each color image into the color space of the output device for outputting the image, by using selected conversion data, and synthesizing the color space converted images; and outputting the synthesized image by using the output device.

7. A storage medium for storing therein a computer readable program to execute an image processing method under control of an operating system (OS), said method comprising the steps of:

inputting a discrimination result discriminated by communicating with a plurality of output devices to discriminate a type of each output device;

inputting a plurality of color images respectively represented by different color spaces;

reading out conversion data according to the color space of each color image and the type of the output device for outputting the image, from among conversion data stored in a storage means;

converting each color image into the color space of the output device for outputting the image, by using selected conversion data, and synthesizing the color space converted images; and outputting the synthesized image by using the output device.

* * * * *

UNITED STATES PATENT AND TRADEMARK OFFICE
CERTIFICATE OF CORRECTION

PATENT NO.    : 5,930,389
DATED         : July 27, 1999
INVENTOR(S)   : SATOSHI TANIO Page 1 of 2

It is certified that error appears in the above-identified patent and that said Letters Patent is hereby corrected as shown below:

On the title page:

AT [56] REFERENCES CITED

Attorney, Agent, or Firm—, "Fitzpatrick, Cella, Haroer & Scubti" should read --Fitzpatrick, Cella, Harper & Scinto--.

COLUMN 1

Line 66, "an" should read --a--.

COLUMN 2

Line 52, "file," should read --files,--.

COLUMN 5

Line 15, "device" should read --devices--; and
   Line 33, "regarded" should read --be regarded--.

COLUMN 7

Line 1, "total" should read --for a total of--; and
   Line 8, "on" should be deleted.

UNITED STATES PATENT AND TRADEMARK OFFICE
CERTIFICATE OF CORRECTION

PATENT NO.   : 5,930,389
DATED        : July 27, 1999
INVENTOR(S)  : SATOSHI TANIO

It is certified that error appears in the above-identified patent and that said Letters Patent is hereby corrected as shown below:

COLUMN 9

Line 27, "board every board" should read --board for every board--; and
  Line 58, "made" should read --made to--.

Signed and Sealed this

Eleventh Day of July, 2000

Attest:

Q. TODD DICKINSON

*Attesting Officer*   *Director of Patents and Trademarks*